United States Patent
Cobb et al.

(10) Patent No.: US 8,905,074 B2
(45) Date of Patent: Dec. 9, 2014

(54) APPARATUS FOR CONTROLLING GAS DISTRIBUTION USING ORIFICE RATIO CONDUCTANCE CONTROL

(75) Inventors: Corie Lynn Cobb, Mountain View, CA (US); Ming Xu, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 541 days.

(21) Appl. No.: 13/091,827

(22) Filed: Apr. 21, 2011

(65) Prior Publication Data
US 2012/0097266 A1    Apr. 26, 2012

Related U.S. Application Data

(60) Provisional application No. 61/405,973, filed on Oct. 22, 2010.

(51) Int. Cl.
*F17D 3/00*        (2006.01)
*F16K 51/02*      (2006.01)

(52) U.S. Cl.
CPC ....................................... *F16K 51/02* (2013.01)
USPC ...................... 137/599.06; 137/884

(58) Field of Classification Search
USPC ........... 251/118; 137/599.05, 599.06, 599.07, 137/884, 266, 597, 599.08
See application file for complete search history.

(56) References Cited

U.S. PATENT DOCUMENTS

| | | | | |
|---|---|---|---|---|
| 1,615,730 | A * | 1/1927 | Vallier | 137/553 |
| 2,182,724 | A * | 12/1939 | Hennessy | 137/601.05 |
| 2,509,042 | A * | 5/1950 | McIlroy | 703/9 |
| 2,813,700 | A * | 11/1957 | Schenck, Jr. | 165/160 |
| 3,081,942 | A * | 3/1963 | Maclay | 341/151 |
| 3,674,205 | A * | 7/1972 | Kock | 239/1 |
| 4,170,245 | A * | 10/1979 | Haley | 137/487.5 |
| 4,757,943 | A * | 7/1988 | Sperling et al. | 236/12.12 |

(Continued)

FOREIGN PATENT DOCUMENTS

| | | | | | |
|---|---|---|---|---|---|
| JP | 62246664 | A | * | 10/1987 | ............. F16K 1/54 |
| JP | 63096369 | A | * | 4/1988 | ............. F16K 1/54 |

OTHER PUBLICATIONS

Product Datasheet DELTA™ II Flow Ratio Controller. Downloaded from web site http://www.mksinst.com/product/Category.aspx?CategoryID=66 on Oct. 27, 2011.
U.S. Appl. No. 12/907,942, filed Oct. 19, 2010, Cruse et al.

*Primary Examiner* — John Rivell
*Assistant Examiner* — Seth W Mackay-Smith
(74) *Attorney, Agent, or Firm* — Moser Taboada; Alan Taboada

(57) ABSTRACT

Apparatus for controlling gas distribution are provided. In some embodiments, apparatus for controlling gas distribution may include a first flow path from an inlet to a first outlet; a plurality of first orifices disposed within the first flow path; a plurality of first valves that control gas flow through the plurality of first orifices to control a total gas flow at the first outlet; a second flow path from the inlet to a second outlet; a plurality of second orifices disposed along the second flow path; a plurality of second valves that control gas flow through respective ones of the plurality of second orifices to control a total gas flow at the second outlet; and a mounting block having the plurality of first valves and second valves coupled thereto, wherein at least a portion of the first flow path and the second flow path is disposed within the mounting block.

20 Claims, 10 Drawing Sheets

(56) References Cited

U.S. PATENT DOCUMENTS

| | | | | |
|---|---|---|---|---|
| 4,830,055 A | * | 5/1989 | Kolibas | 137/884 |
| 5,150,690 A | * | 9/1992 | Carter et al. | 123/527 |
| 5,178,359 A | * | 1/1993 | Stobbs et al. | 251/30.02 |
| 5,402,824 A | * | 4/1995 | Hosoya et al. | 137/596.17 |
| 5,520,333 A | * | 5/1996 | Tofte | 239/10 |
| 5,875,817 A | * | 3/1999 | Carter | 137/599.06 |
| 6,360,762 B2 | * | 3/2002 | Kitayama et al. | 137/1 |
| 6,941,965 B2 | * | 9/2005 | Lull et al. | 137/9 |
| 7,343,930 B2 | * | 3/2008 | Rosko | 137/597 |
| 7,377,481 B2 | * | 5/2008 | Narita et al. | 251/129.15 |
| 7,424,894 B2 | * | 9/2008 | Lull et al. | 137/9 |

* cited by examiner

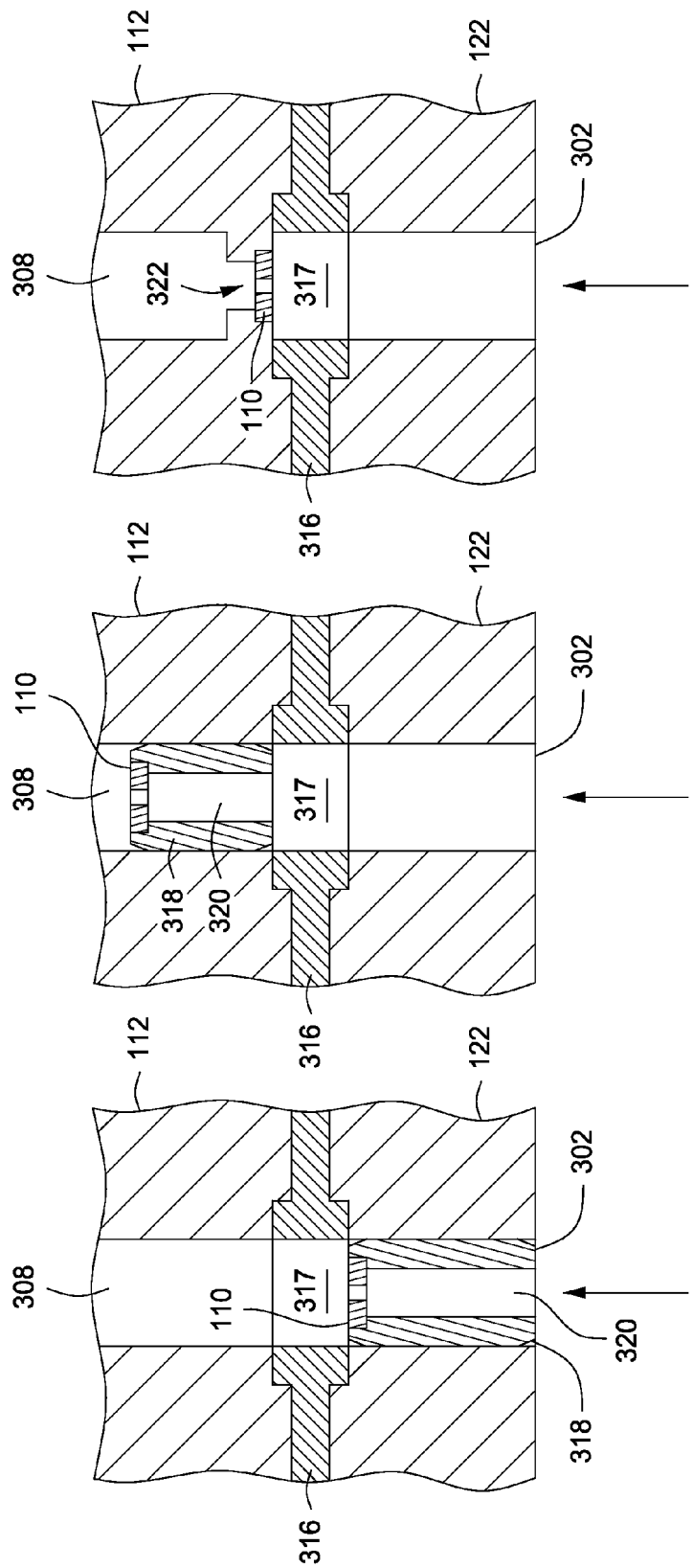

APPARATUS FOR CONTROLLING GAS DISTRIBUTION USING ORIFICE RATIO CONDUCTANCE CONTROL

CROSS-REFERENCE TO RELATED APPLICATIONS

This application claims benefit of U.S. provisional patent application Ser. No. 61/405,973, filed Oct. 22, 2010, which is herein incorporated by reference.

FIELD

Embodiments of the present invention generally relate to substrate processing.

BACKGROUND

Ultra-large-scale integrated (ULSI) circuits may include more than one million electronic devices (e.g., transistors) that are formed on a semiconductor substrate, such as a silicon (Si) substrate, and cooperate to perform various functions within the device. Plasma etching is commonly used in the fabrication of transistors and other electronic devices. During some etching processes, one or more process gases may be provided to two or more regions, or zones, within the process chamber to etch a substrate disposed within the process chamber. In such applications, active flow controllers, such as flow sensors and flow controllers controlled based upon sensed flow, may be used to actively control the flow of the one or more gases provided to the process chamber zones. Alternatively, combinations of fixed orifices may be used to try to control the flow of the one or more gases provided to the process chamber zones.

The inventors have provided improved apparatus for controlling gas distribution.

SUMMARY

Apparatus for controlling gas distribution are provided herein. In some embodiments, an apparatus for controlling gas distribution includes a first flow path from an inlet to a first outlet, a plurality of first orifices disposed within the first flow path, a plurality of first valves that selectively control gas flow through respective ones of the plurality of first orifices to control a total gas flow at the first outlet of the first flow path, a second flow path from the inlet to a second outlet, a plurality of second orifices disposed along the second flow path, a plurality of second valves that selectively control gas flow through respective ones of the plurality of second orifices to control a total gas flow at the second outlet of the second flow path, and a mounting block having the plurality of first valves and the plurality of second valves coupled to the mounting block, wherein at least a portion of the first flow path and at least a portion of the second flow path is disposed within the mounting block.

In some embodiments, an apparatus for controlling gas distribution include a mounting block having an inlet, a first outlet, and a second outlet, wherein the inlet is coupled through a first flow path to the first outlet and wherein the inlet is coupled through a second flow path to the second outlet, wherein the mounting block is formed by a plurality of blocks coupled together, and wherein the first and second flow paths are disposed at least partially within the mounting block, a plurality of first valves coupled to the mounting block along the first flow path and a plurality of second valves coupled to the mounting block along the second flow path, a plurality of seals, wherein each one of the plurality of seals is disposed between each one of the plurality of first valves and the mounting block or each one of the plurality of second valves and the mounting block, a plurality of first orifices disposed within the first flow path, wherein each one of the plurality of first valves selectively controls gas flow through a corresponding one of the plurality of first orifices to control a total gas flow at the first outlet, and a plurality of second orifices disposed within the second flow path, wherein each one of the plurality of second valves selectively controls gas flow through a corresponding one of the plurality of second orifices to control a total gas flow at the second outlet. Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

FIGS. 3A-D respectively depict partial schematic views of an interface between a mounting block and a valve of the gas distribution system in accordance with some embodiments of the present invention.

Figure 1:
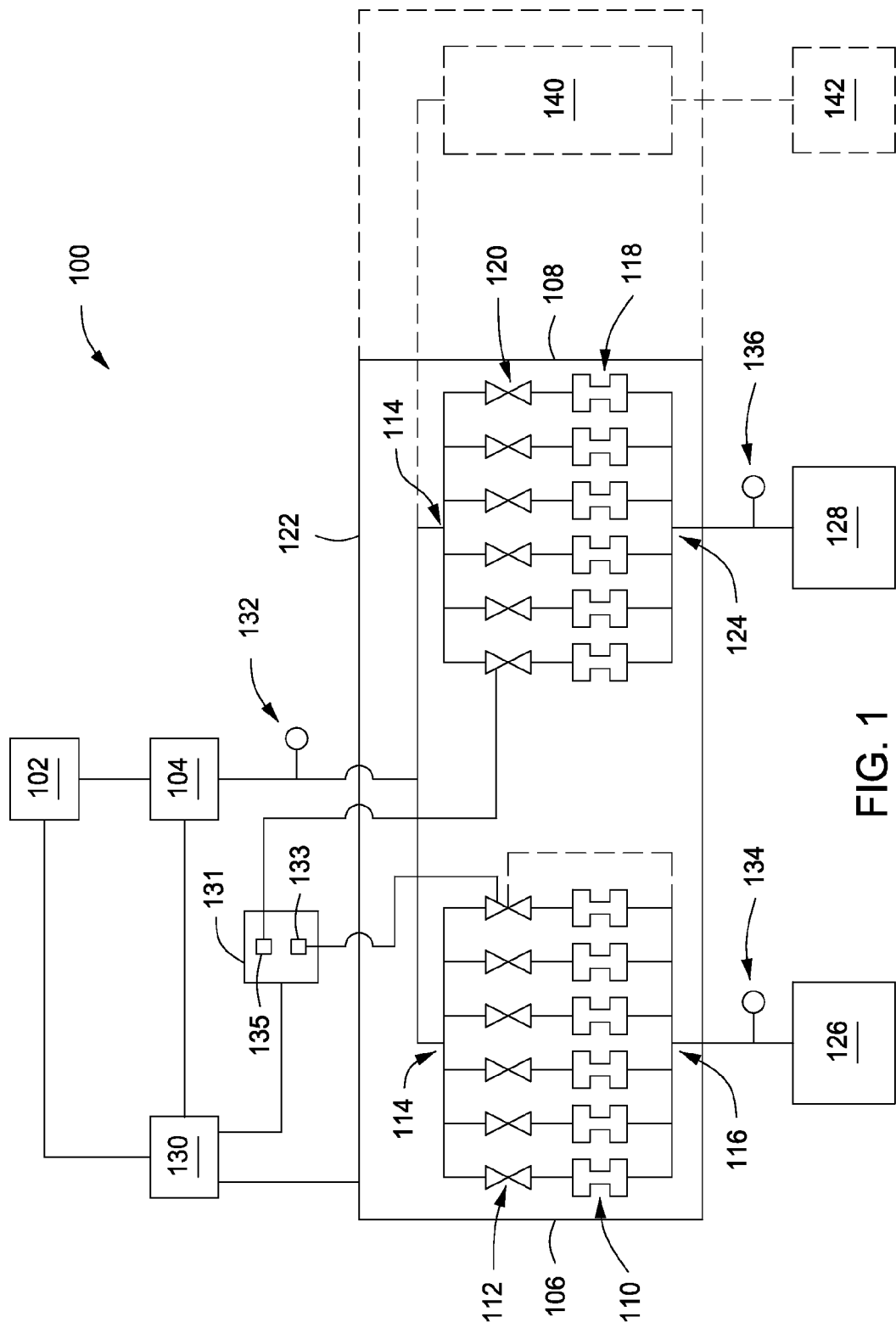
FIG. 1 depicts a schematic view of an exemplary gas distribution system in accordance with some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention provide a gas distribution system for delivery of a gas to a chamber. The inventors have observed that, in certain applications, active control devices for controlling flow ratios of process gases provided to one or more process chambers may fail and indicate a sudden change in the measured flow down the controlled path for the flow splitter. The inventors believe that this failure may be related to a thermal reaction occurring when the gasses mix and have an endothermic or exothermic reaction, causing the active flow sensors determine the flow erroneously. This may undesirably cause production variation or failures due to attempts to correct the gas flow when no correction is needed and may further lead to downtime of the process chamber if process controllers fault the process chamber for being out of control. In addition, the inventors have further observed general process drift in active flow ratio controllers.

In applications where combinations of fixed orifices are used to try to control the flow of the one or more gases provided to the process chamber zones, the inventors have observed that such fixed orifice devices are unsatisfactory for providing multiple flow ratios for processes having dynamic (e.g., changing) ratio requirements. Further, the inventors have observed that cost and footprint of such fixed orifice devices can be prohibitive.

As such, the inventors have provided herein embodiments of an inventive apparatus that provide gas delivery to multiple gas delivery zones (for example, within a process chamber or between a plurality of process chambers) in a desired flow ratio. Embodiments of the inventive apparatus utilize a plurality of fixed orifices arranged in two or more flow control manifolds that can be selectively coupled between a gas source and desired gas delivery zones. Embodiments of the inventive apparatus may advantageously reduce general process drift, for example, as compared to process drift resultant from the use of active flow control devices. Further, in some embodiments, the inventive apparatus may provide a compact flow path resulting in a reduced footprint and cost of the apparatus.

Embodiments of the present invention are based on a principle that flow through an orifice is directly proportional to the cross-sectional area of the orifice. If a gas stream is split between two orifices where one is twice as large (in cross-sectional area) as the other, the ratio of the flows will be two to one. This principle is dependent on both orifices having the same upstream and downstream pressures. In some embodiments of the present invention, different gas delivery zones coupled to the apparatus (e.g., zones of a showerhead, different process chambers, or the like) may have different conductance, or resistance to flow and, thus, the downstream pressures may not be the same. Thus, in some embodiments, the apparatus may operate in a choked flow condition (e.g., the upstream pressure is at least twice the downstream pressure) such that the flow will only be a function of the upstream pressure.

For example, FIG. 1 depicts a schematic view of an exemplary gas distribution system 100 in accordance with some embodiments of the present invention. Although the system depicted in FIG. 1 primarily relates to providing a gas flow to two gas delivery zones (e.g., 126, 128), the system may be expanded in accordance with the principles disclosed herein to providing the gas flow to additional gas delivery zones (e.g., 142, as shown in phantom). The gas distribution system 100 generally includes one or more mass flow controllers (one mass flow controller 104 shown), a first flow control manifold 106 (e.g., a first flow path), and a second flow control manifold 108 (e.g., a second flow path) (additional flow control manifolds, similarly configured as described herein, may be provided, as shown by reference numeral 140 in phantom). The mass flow controller 104 is typically coupled to a gas distribution panel 102 that provides one or more gases or gaseous mixtures (referred to throughout and in the claims as a gas). The mass flow controller 104 controls the total flow rate of the gas through the gas distribution apparatus 100 and is coupled to both of the first and second flow control manifolds 106, 108 at respective inlets thereof. Although one mass flow controller 104 is shown, a plurality of mass flow controllers may be coupled to the gas distribution panel 102 to meter respective process gases from the gas distribution panel 102. The outputs of the one or more mass flow controllers 104 are generally coupled (e.g., fed into a common conduit, mixer, plenum, or the like, or combinations thereof) prior to being split and routed to each flow control manifold (e.g., 106, 108).

The first flow control manifold 106 may extend from an inlet 114 to a first outlet 116. The first flow control manifold 106 may include a plurality of first orifices 110 disposed within the first flow control manifold 106. A plurality of first valves 112 may be used to selectively control gas flow through respective ones of the plurality of first orifices 110 to control a total gas flow at the first outlet 116 of the first flow control manifold 106. The plurality of first valves 112 may be selectively opened or closed in order to selectively permit a gas to flow from the outlet of the mass flow controller 104 through one or more of the plurality of first orifices 110 to the first outlet 116, for example, from the inlet 114 through one or more of the plurality of first orifices 110 to the first outlet 116.

Figure 5:
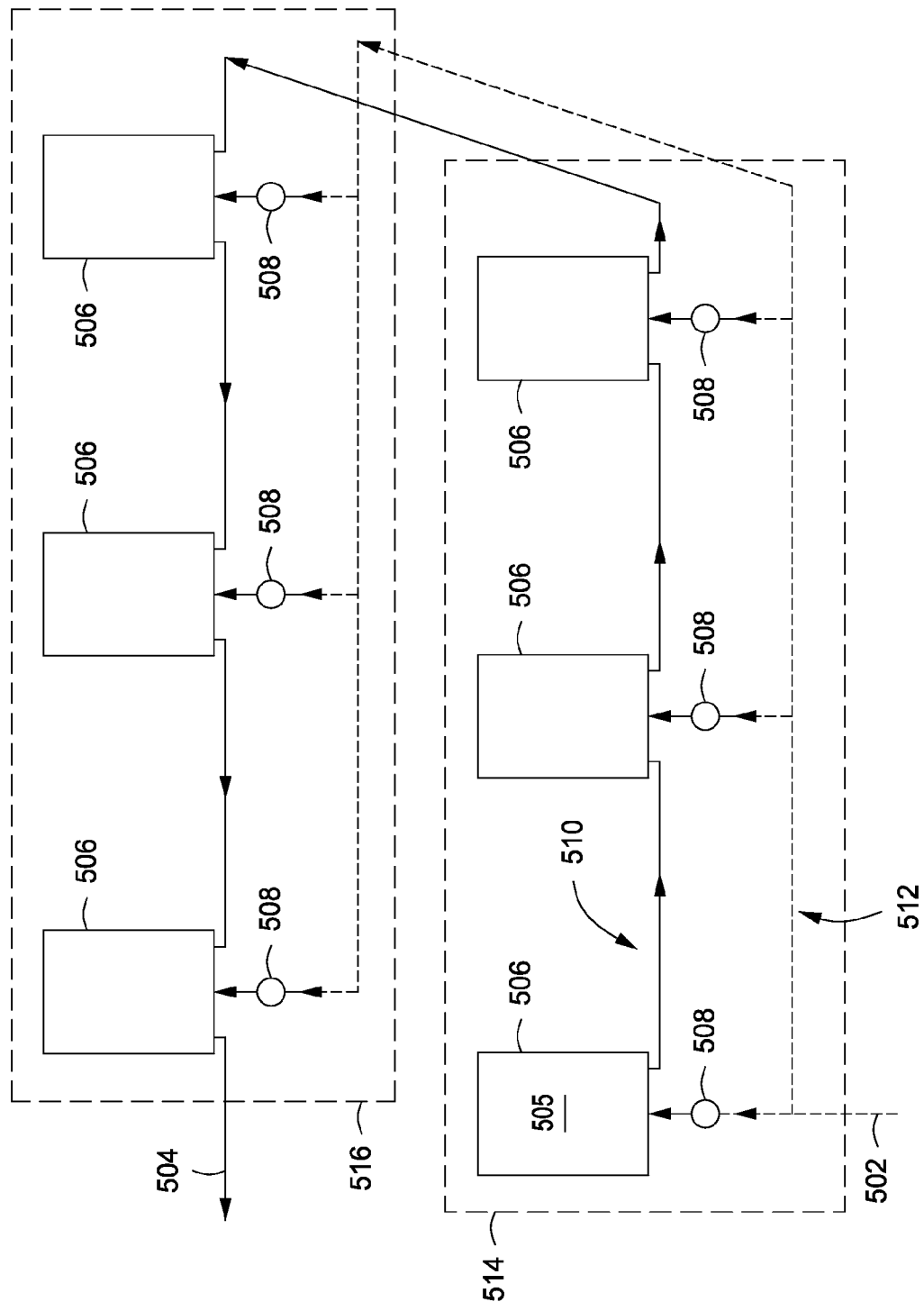
FIG. 5 depicts a schematic view of a flow path of an exemplary gas distribution system in accordance with some embodiments of the present invention.

Using the plurality of first valves to selectively control gas flow through respective first orifices, provides flexibility in the configuration or arrangement of the physical hardware of the first flow control manifold. For example, as shown in FIG. 5, a flow control manifold may include an inlet 502 and outlet 504, and a plurality of valves 506 disposed therebetween. In some embodiments, a first valve 505 of the plurality of valves 506 adjacent the inlet 502 may be a two-way valve and the remainder of the valves may be three-way valves. In some embodiments, the valves may be plumbed in series. Respective orifices 508 may be disposed along an inlet of each corresponding valve 506. A primary flow path 510 may be defined along the outlets of each valve 506 to the outlet 504. A secondary flow path 512 may be defined from the inlet 502 to each inlet of each respective valve 506. A gas entering the flow manifold at the first inlet 502 flows along the secondary flow path 512 and can only moved to the primary flow can path 510 through an orifice 508 when a particular valve 506 is open. And the gas moving to the primary flow path 510 through respective orifice 508 may then proceed to the outlet 504. Coupling individual valves to get on this matter allows for the arbitrary grouping of the valves into one or more portions, for example, a first portion 514 and a second portion 516 shown in FIG. 5. Although portions 514 and 516 each have three valves and orifices contained therein is apparent that greater or fewer numbers of valves can be included in each portion, including all valves in a single portion and greater numbers of portions than two.

Returning to FIG. 1, the first flow control manifold 106 (e.g., a first flow path) may further comprise a plurality of sub-paths, such as a first sub-path 105 and a second sub-path 107. For example, in some embodiments and as illustrated in FIG. 1, the first sub-path 105 may be coupled to the inlet 114 and an inlet 111 of each first valve 112. In some embodiments, the plurality of first orifices 110 may be disposed along the first sub-path 105. The second sub-path 107 may be coupled to an outlet 113 of each first valve 112 and the first outlet 116.

Similarly, the second flow control manifold 108 may extend from the inlet 114 to a second outlet 124. The second flow control manifold 108 may include a plurality of second orifices 118 disposed within the second flow control manifold 108. A plurality of second valves 120 may be used to selectively control gas flow through respective ones of the plurality of second orifices 118 to control a total gas flow at the second outlet 124 of the second flow control manifold 108. The plurality of second valves 120 may be selectively opened or closed in order to selectively permit a gas to flow from the outlet of the mass flow controller 104 through one or more of the plurality of second orifices 118 to the second outlet 124, for example, from the inlet 114 through one or more of the plurality of second orifices 118 to the second outlet 116. Similarly, the second flow manifold 108 may further include a first and second sub-path (not labeled in FIG. 1). Similarly additional flow control manifolds (such as 140) may be provided to provide a gas in a desired flow ratio to additional gas delivery zones (such as 142).

The gas distribution system 100 may include a mounting block 122. In some embodiments, at least a portion of the first and second flow control manifolds 106, 108 may be disposed within the mounting block. In some embodiments, the first and second flow control manifolds 106, 108 may be predominantly disposed within the mounting block 122. For example, in some embodiments, the first and second valves 112, 120 may be coupled to the mounting block 122. Similarly, additional flow control manifolds (such as 140) may be at least partially disposed within the mounting block 122. The mounting block 122 may advantageously be machined to include one or more portions of the first and second flow control manifolds 106, 108. For example, the machining of the manifolds into the mounting block 122 may advantageously reduce the need for piping, connectors, valves, and other parts necessary to construct a manifold for flowing one or more gases. Accordingly, the mounting block 122 may advantageously reduce the cost and/or footprint of the gas distribution apparatus 100.

Figure 6A:
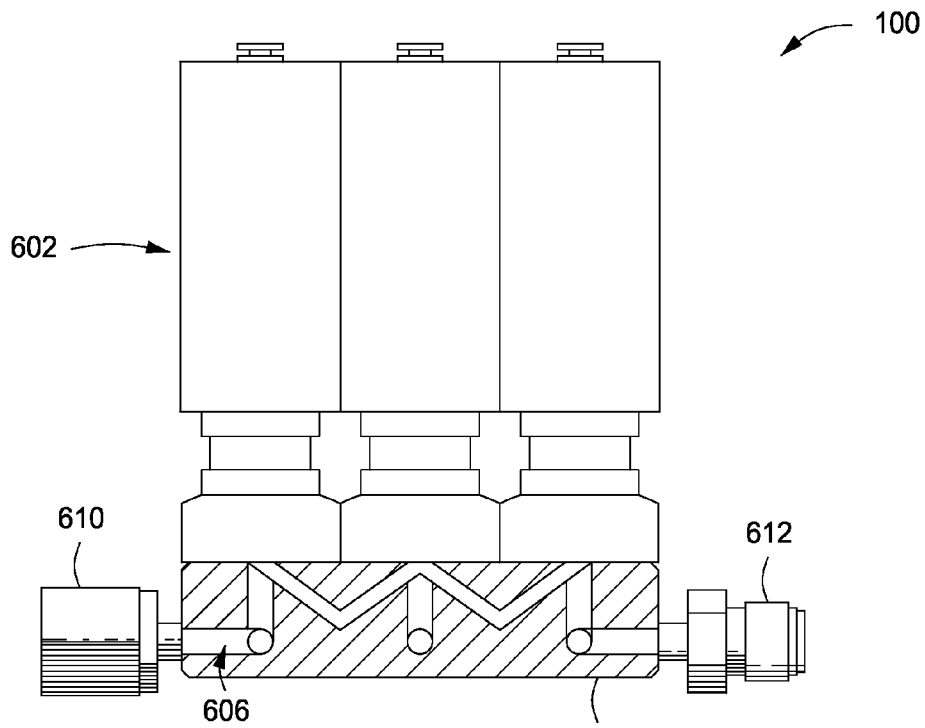
FIGS. 6A-B respectively depict top and side views of a gas distribution system in accordance with some embodiments of the present invention.
Figure 6B:
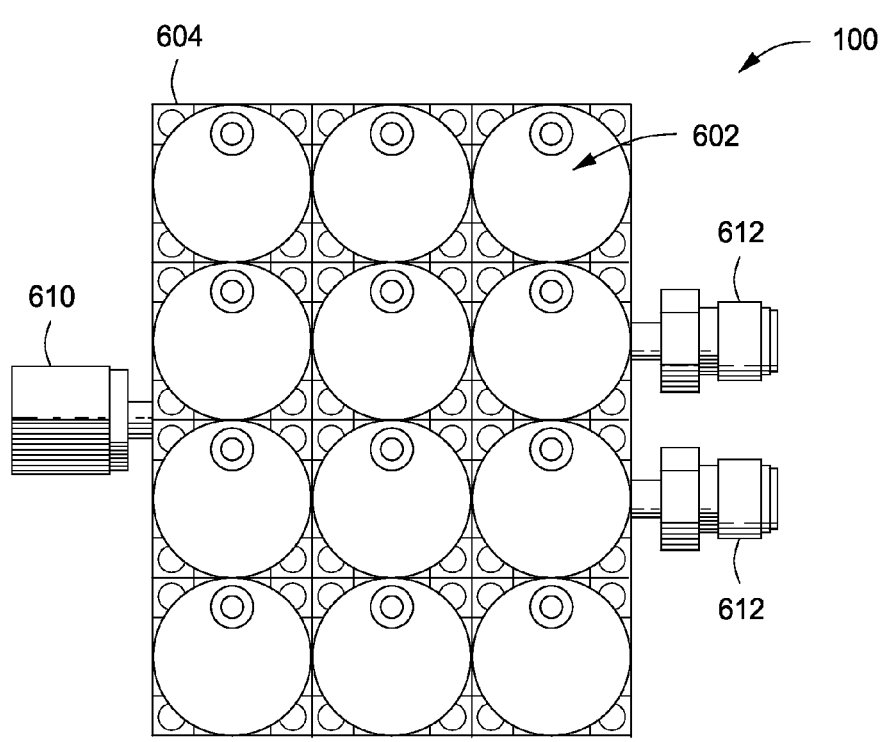
Figure 7A:
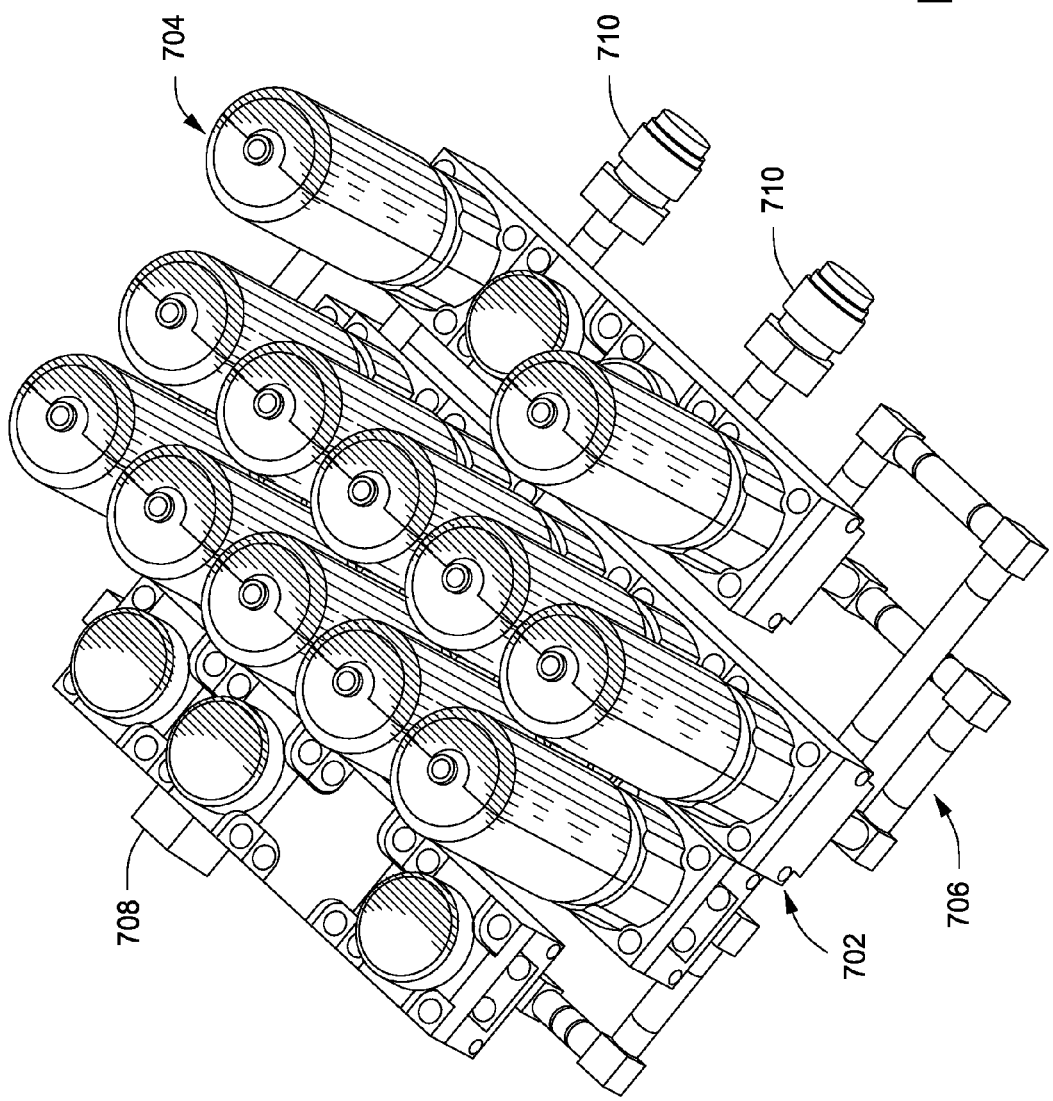
FIGS. 7A-B respectively depict isometric and exploded isometric views of a gas distribution system in accordance with some embodiments of the present invention.
Figure 7B:
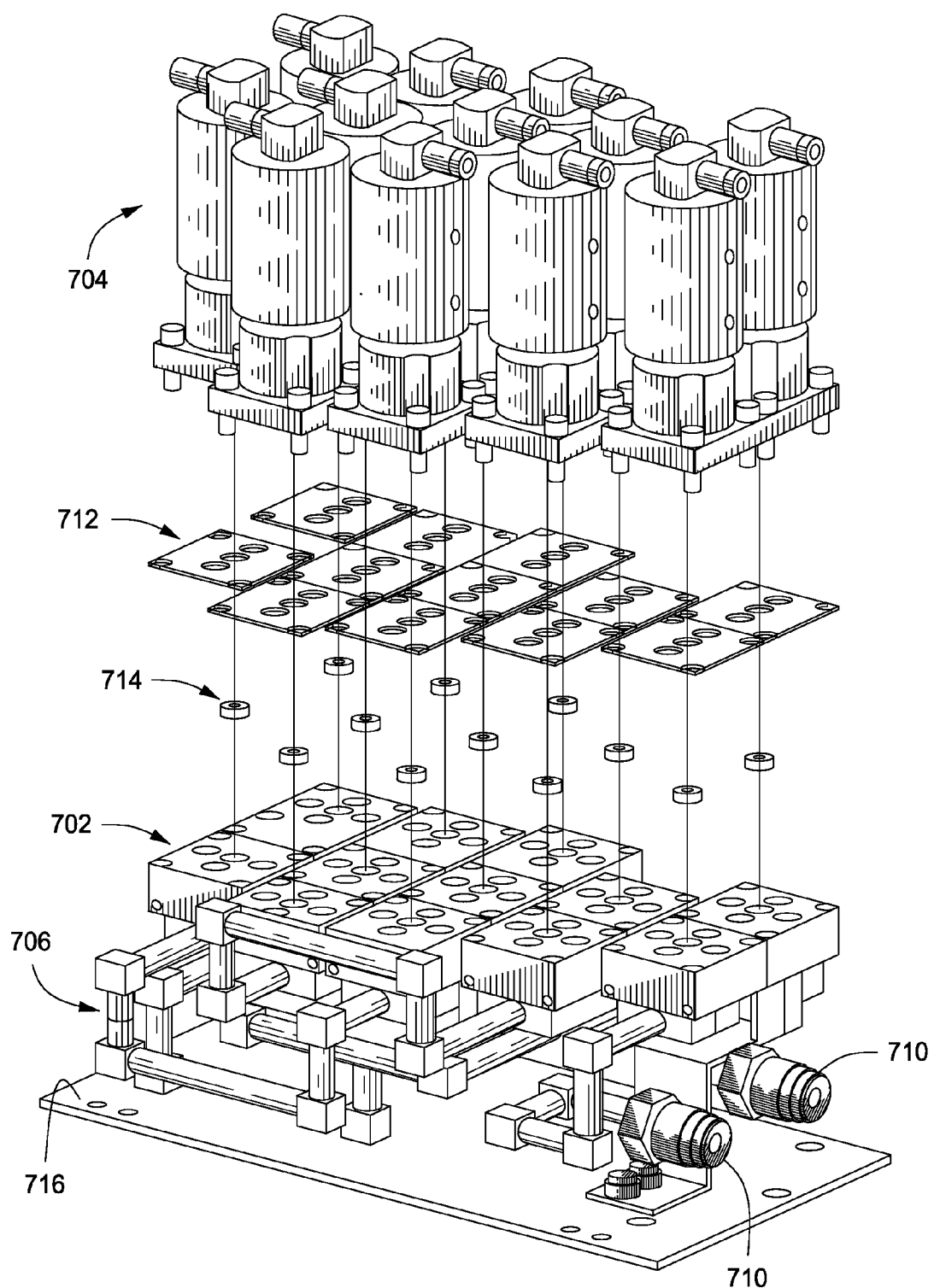

For example, FIGS. 6A and 6B respectively depict side and top views of a portion of the gas dispute apparatus 100 in accordance with some embodiments of the invention. FIGS. 6A and 6B depict a plurality of valves 602 coupled to the mounting block 604 having a first and second flow path (flow path 606 shown in the side view FIG. 6A) machined therein and extending between an inlet 610 and a pair of outlets 612. The mounting block (e.g., 122, 604) may be a single block or multiple blocks coupled together. For example, the mounting block 604 depicted in FIGS. 6A and 6B is a singular component. However the mounting block 702 shown in FIGS. 7A and 7B comprises a plurality of mounting blocks that are plumbed together to define the first and second flow paths. For example shown in FIGS. 7A and 7B a plurality of valves 704 are mounted to the plurality of mounting blocks 702. A plurality of conduits 706 are provided to define portions of the first and second flow paths that exist outside of the plurality of mounting box 702 between the inlet 708 and a pair of outlets 710. As shown in the exploded view of FIG. 7B a plurality of seals 712 may be disposed between each respective valve 704 and the mounting block 702 and orifice 714 is disposed between each valve 704 and mounting block 702. In some embodiments, a base 716 may be provided to mount the gas delivery apparatus thereon.

Returning to FIG. 1, the first and second outlets 116, 124 of the first and second flow control manifolds 106, 108 may be respectively coupled to a first gas delivery zone 126 and a second gas delivery zone 128. Each gas delivery zone 126, 128 may thus receive a desired percentage of the total gas flow provided by the mass flow controller 104 based upon a desired flow ratio imposed by the selective coupling of the first orifices 110 and the second orifices 118. The gas delivery zones 126, 128 may generally be any zones where control over the gas flow ratio is desired.

Figure 2A:
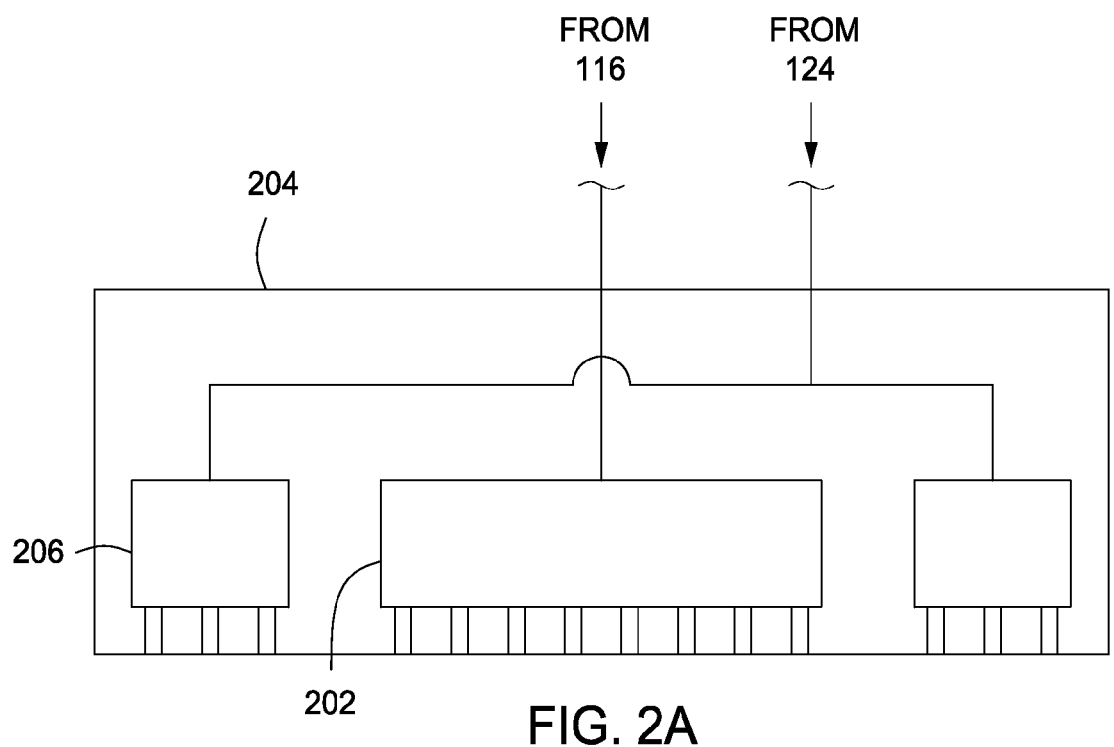
FIGS. 2A-C respectively depict partial schematic views of gas delivery zones coupled to the gas distribution system of FIG. 1 in accordance with some embodiments of the present invention.

For example, in some embodiments, and as shown in FIG. 2A, the first gas delivery zone 126 may correspond to a first zone 202, such as an inner zone, of a showerhead 204 for providing the gas to a process chamber in which the showerhead 204 is installed. The second gas delivery zone 128 may correspond to a second zone 206, such as an outer zone, of the showerhead 204.

Figure 2B:
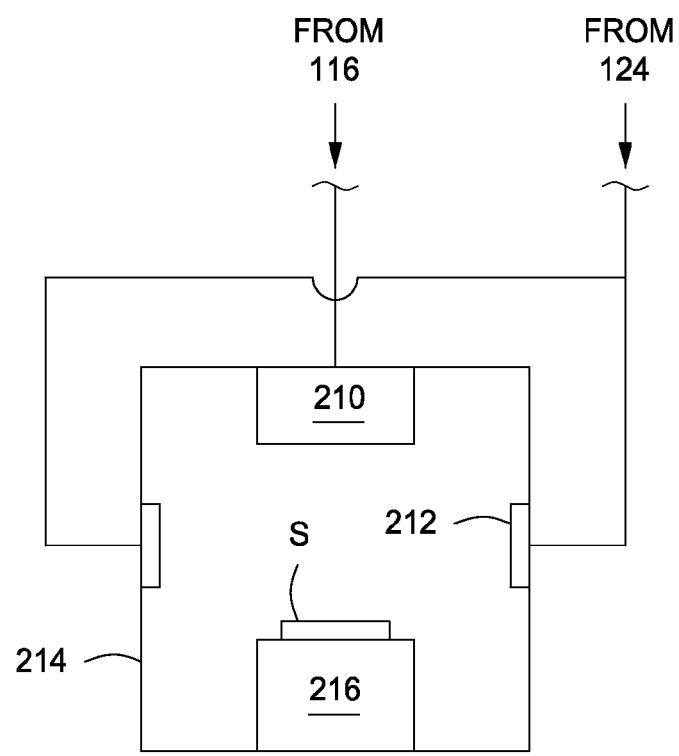

In some embodiments, as shown in FIG. 2B, the first and second gas delivery zones 126, 128 may be respectively provided to a showerhead 210 and one or more gas inlets 212 of a process chamber 214 having a substrate support 216 for supporting a substrate S thereon.

Figure 2C:
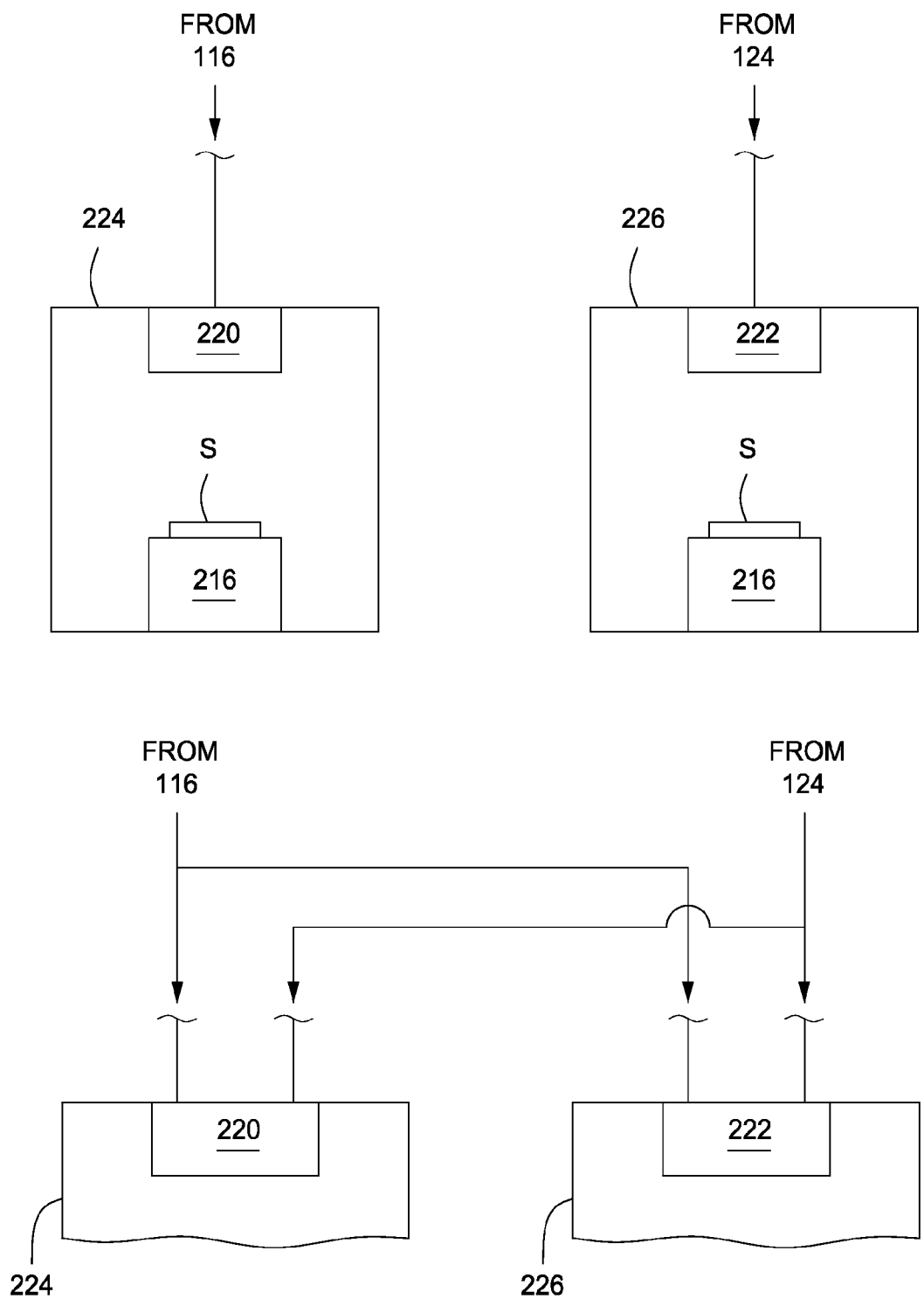

In some embodiments, as shown in the upper portion of FIG. 2C, the first and second gas delivery zones 126, 128 may be respectively provided to showerheads 220, 222 (and/or other gas inlets) of different process chambers 224, 226 having substrate supports for supporting respective substrates S thereon. For example, in some embodiments, the first and second process chambers 224, 226 may be part of a twin chamber processing system. One example of a twin chamber processing system that may be modified to incorporate the present invention in accordance with the teachings herein is described in U.S. Provisional Patent Application Ser. No. 61/330,156, filed Apr. 30, 2010, by Ming Xu, and entitled, "Twin Chamber Processing System."

Alternatively, and shown in the lower portion of FIG. 2C, the first and second gas delivery zones 126, 128 may be provided to both showerheads 220, 222 (and/or other gas inlets) of different process chambers 224. For example, the first gas delivery zone 126 may correspond to a first zone (such as first zone 202 of showerhead 204 as depicted in FIG. 2A) in each showerhead 220, 222 and the second gas delivery zone 128 may correspond to a second zone (such as second zone 206 of showerhead 204 as depicted in FIG. 2A) in each showerhead 220, 222.

Further, although not shown in FIG. 2C, the first and second gas delivery zones 126, 128 need not be limited to being provided to two showerheads, and may be provided to any suitable plurality of showerheads (or other gas delivery apparatus) in a plurality of process chambers. For example, the first gas delivery zone 126 may correspond to a first zone in a plurality of showerheads of a plurality of process chambers and the second gas delivery zone 128 may correspond to a second zone in a plurality of showerheads of a plurality of process chambers.

Returning to FIG. 1, the first and second valves 112, 120 may be any suitable control valves for use in an industrial environment, or in a semiconductor fabrication environment. In some embodiments, the first and second valves 112, 120 may be pneumatically actuated valves. In some embodiments, the first and second valves 112, 120 may be electrically actuated pneumatic valves. Accordingly, the gas distribution system 100 may include electrical actuation manifold 131, for example, such as a solenoid stack or the like. The electrical actuation manifold 131 may include a plurality of electrical actuation devices (only two devices 133, 135 are shown), such as solenoid valves or the like for controlling the flow of a pneumatic gas, such as air, to each first or second valve 112, 120. For example, in some embodiments, each one of the plurality of electrical actuation devices (e.g., devices 133 or 135) may be coupled to either one of the plurality of first valves 112 or one of the plurality of second valves 120 for electrically actuating pneumatic control of either the one of the plurality of first valves 112 or the one of the plurality of second valves 120. As illustrated in FIG. 1, the electrical actuation device 133 is coupled to one of the plurality of first valves 112 and the electrical actuation device 135 is coupled to one of the plurality of second valves 120. Additional electrical actuation devices have been omitted to preserve the clarity of FIG. 1, however, in some embodiments, each valve may have an electrical actuation device coupled thereto.

In the embodiment depicted in FIG. 1, six first orifices 110 and six second orifices 118 are shown, each coupled to respective first valves 112, and respective second valves 120. However, each flow control manifold does not need to have the same number of orifices—although having the same number and configuration of orifices facilitates ease of providing the same flow ratios between the first and second gas delivery zones 126, 128 regardless of whether the ratio is between the first and the second gas delivery zones 126, 128 or between the second and the first gas delivery zones 128, 126. In addition, each zone may have a fewer or greater number of orifices than six. Generally speaking, fewer orifices allows fewer flow ratios to be provided, and more orifices allow more flow ratios to be provided, but at greater cost and complexity. As such, the number of orifices provided may be selected based upon the desired processing flexibility required for a particular application.

The configuration of the gas distribution system 100 may be determined based upon the anticipated operating conditions and output requirements for a particular application. For example, FIGS. 1, 6A-B, and 7A-B, each show illustrative, non-limiting configurations of the gas distribution system in accordance with some embodiments of the present invention. Other configurations of the gas distribution system may be used to fit the needs of a particular application. Further description of the configuration of a gas distribution system and methods for the configuration are described in U.S. Provisional Patent Application Ser. No. 61/330,047, filed Apr. 30, 2010, by James P. Cruse et al., and entitled, "Methods and Apparatus for Reducing Flow Splitting Errors using Orifice Ratio Conductance Control," which is hereby incorporated herein by reference in its entirety.

Each of the first and second valves 112, 120 may be the same or different depending on location of the valve within the first or second flow control manifold 106, 108. For example, in some embodiments, a first valve 112 having only one adjacent first valve 112 may be a two-way valve (e.g., having only one flow path that may be selectively opened or closed by the valve). In some embodiments, a first valve 112 having two adjacent first valves 112 (e.g., one first valve 112 on either side) may be a three-way valve (e.g., having a first flow path that may always be open and a second flow path that may be selectively opened or closed to the first flow path). Exemplary embodiments of a three-way valve are described below with respect to FIGS. 3A-D.

FIGS. 3A-D respectively depict partial schematic views of an interface between a mounting block and a valve of the gas distribution system 110 in accordance with some embodiments of the present invention. The embodiments of FIGS. 3A-D may apply to a single mounting block, such as the mounting block 122 illustrated in FIG. 1, or a plurality of mounting blocks, such as one of the plurality of mounting blocks 402, 404 described below and illustrated in FIG. 4. The embodiments of FIGS. 3A-D are described below with respect to the mounting block 112 and one of the plurality of first valves 112 and one of the plurality of first orifices 110. However, the embodiments of FIGS. 3A-B can also be applied to one of the plurality of second valves 120, one of the plurality of second orifices 118 and the aforementioned plurality of mounting blocks 402.

Figure 3A:
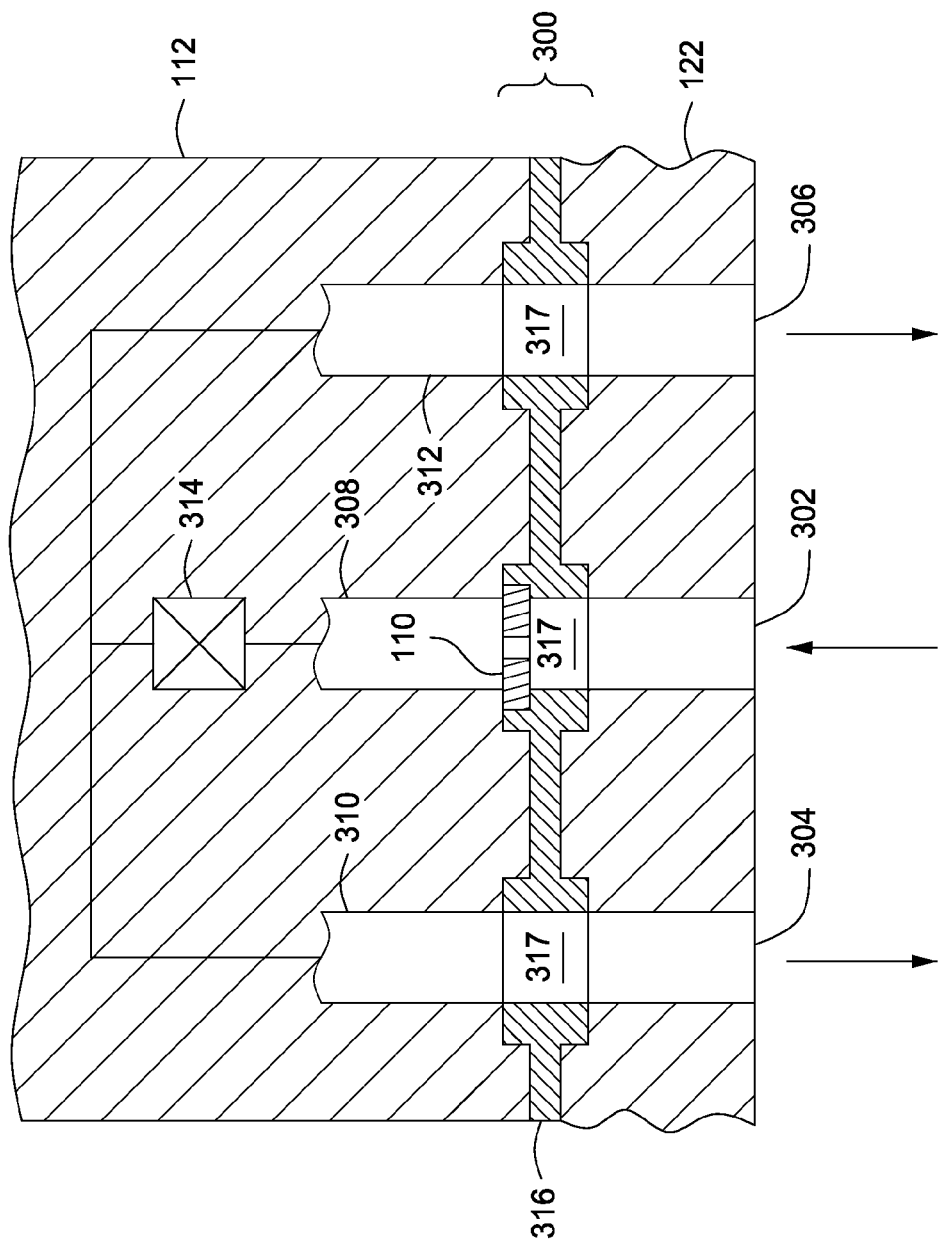

FIG. 3A depicts a partial schematic view of an interface 300 between the mounting block 122 and one of the plurality of first valves 112. The mounting block 122 may include a plurality of openings corresponding respectively to a plurality of openings in the first valve 112. For example, as illustrated in FIG. 3A, the mounting block 122 may include an inlet 302 and first and second outlets 304, 306. For example, the inlet 302 may be part of the first sub-path 105 and the first and second outlets 304, 306 may be part of the second sub-path 107 as discussed above. The first valve may include an inlet 308 corresponding to the inlet 302 of the mounting block 122, and first and second outlets 310, 312 corresponding respectively to the first and second outlets 304, 306 of the mounting block 122. The first valve 112 as illustrated in FIG. 3A may be a three-way valve. For example, a first flow path defined between the first and second outlets 310, 312 may always be open, and a second flow path coupling the inlet 308 to the first and second outlets 310, 312 of the first valve 112 may be selectively opened or closed by a mechanism 314. For example, the mechanism 314 may be a piston, a diaphragm, a spring actuated disk, or other suitable valve sealing mechanism.

A seal 316 may be disposed at the interface 300 between the first valve 112 and the mounting block 122. The seal 316 may comprise any suitable seal material that is compatible with the gases utilized with the gas distribution system 100. For example, suitable seal materials may include any gas-compatible corrosion-resistant material. The seal 316 includes a plurality of openings 317 disposed therethrough and corresponding to the various inlets and outlets of the first valve 112 and the mounting block 122.

As illustrated in FIGS. 3A-D, each orifice may be disposed between a corresponding valve and the mounting block. For example, in some embodiments, as illustrated in FIG. 3A, one of the plurality of first orifices 110 may be disposed in the seal 316 between the inlet 302 of the mounting block 122 and the inlet 308 of the first valve 112. For example, one of the first orifices 110 may be disposed the seal 316 and may be clamped, for example, by opposing sides of the seal 316. The first orifice 110 may also be secured to the seal 316 by any other suitable means.

In some embodiments, as illustrated in FIG. 3B, the first orifice 110 may be disposed in the inlet 302 of the mounting block 122. For example, the gas distribution system 100 may include a plurality of inserts 318, where each insert 318 has an opening 320 extending through the insert 318. Each insert 318 can have one of the plurality of first orifices 110 disposed in the opening 320.

Alternatively, the insert 318 having the first orifice 110 disposed therein may be in the first valve 112. For example, as illustrated in FIG. 3C, the insert 318 having the first orifice 110 disposed therein can be disposed in the inlet 308 of the first valve 112.

Alternatively, the first orifice 110 may be disposed in the inlet 308 of the first valve 112. For example, as illustrated in FIG. 3D, the inlet 308 may include a recess 322 disposed therein. The first orifice 110 may be secured in the recess 322. Alternatively, (not shown) a recess similar to recess 322 may be disposed in the inlet 302 of the mounting block 122 and the first orifice 110 may be secured in the recess.

Returning to FIG. 1, one or more pressure gauges may be provided to monitor the pressure at desired locations of the gas distribution apparatus 100. For example, a pressure gauge 132 may be provided to monitor the upstream pressure of the gas distribution apparatus 100. In some embodiments, the pressure gauge 132 may be disposed in a gas line coupled between the mass flow controller 104 and the first and second flow control manifolds 106, 108. Pressure gauges 134, 136 may be provided to respectively monitor the downstream pressure of the gas distribution apparatus 100. In some embodiments, the pressure gauges 134, 136 may be respectively disposed in gas lines respectively coupled between the first and second flow control manifolds 106, 108 and the first and second gas delivery zones 126, 128.

A controller 130 may be provided and coupled to the gas distribution system 100 for controlling the components of the system. For example, the controller 130 may be coupled to the gas distribution panel 102 to select one or more process gases to provide, the mass flow controller 104 to set a desired flow rate, and to each of the first and second flow control manifolds 106, 108 (or to each of the first and second valves 112, 120 contained therein) to control which control valves 112, 120 to open in order to provide the desired flow ratio. The controller may further be coupled to the pressure gauges 132, 134, 136 in order to ensure that the pressure requirements are being met for choked flow and minimized back pressure. The controller may further be coupled to the electrical actuation manifold 131 to control each of the plurality of electrical actuation devices to selectively actuate ones of the plurality of first valves 112 and ones of the plurality of second valves 120 to provide a first desired flow rate through the first outlet 116 and to provide a second desired flow rate through the second outlet 124.

The controller 130 may be any suitable controller and may be the process controller for a process chamber or process tool to which the gas distribution system 100 is coupled, or some other controller. The controller 130 generally includes a central processing unit (CPU) 150, a memory 156, and support circuits 152. The CPU 150 may be one of any form of a general purpose computer processor that can be used in an industrial setting. The support circuits 152 are coupled to the CPU 150 and may comprise cache, clock circuits, input/output subsystems, power supplies, and the like. Software routines 154, such as methods for operating the gas distribution system 100 may be stored in the memory 156 of the controller 130. The software routines 154, when executed by the CPU 150, transform the CPU 150 into a specific purpose computer (controller) 130. The software routines 154 may also be stored and/or executed by a second controller (not shown) that is located remotely from the controller 130.

Figure 4:
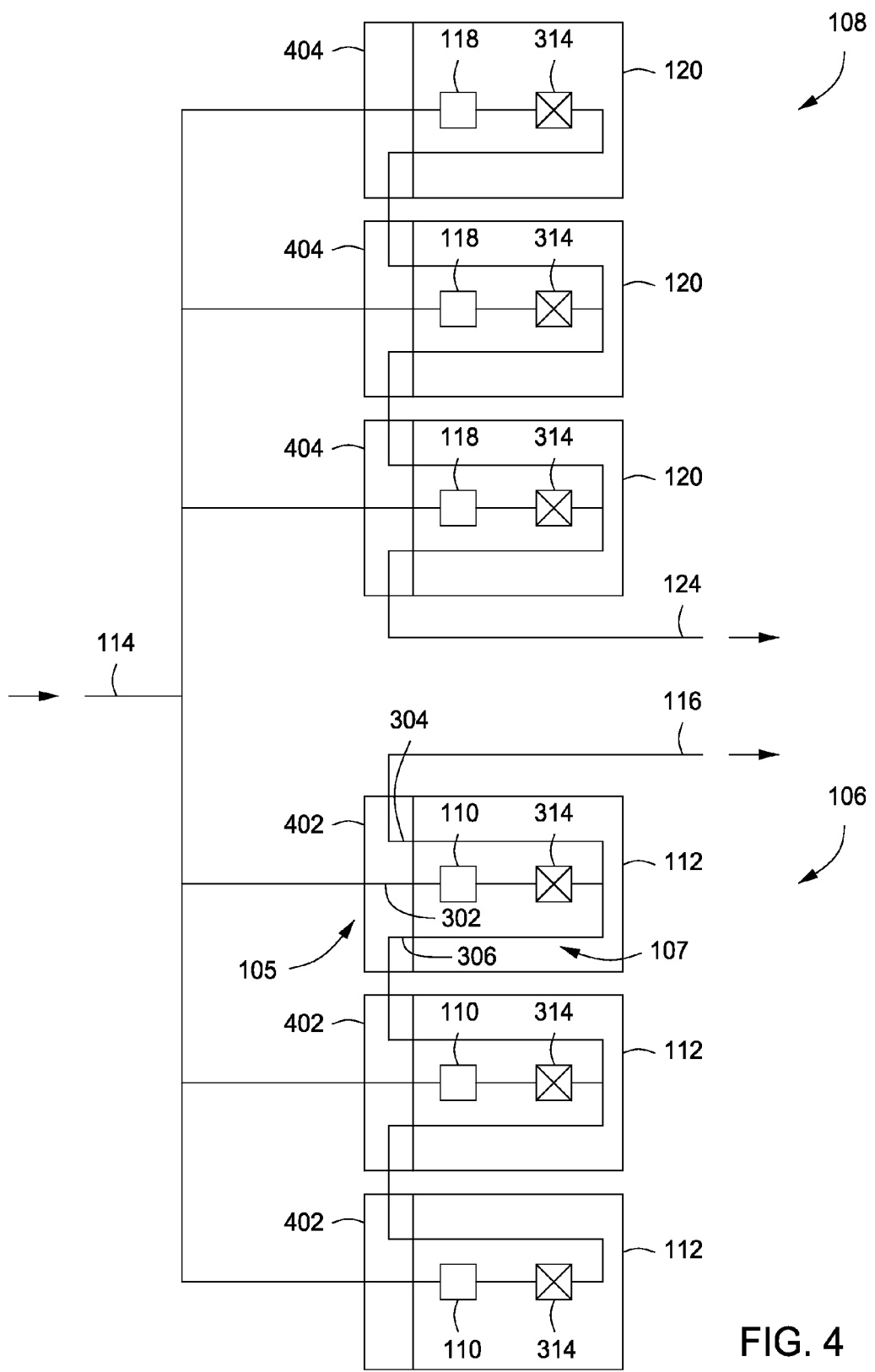
FIG. 4 depicts a schematic view of an exemplary gas distribution system in accordance with some embodiments of the present invention.

FIG. 4 depicts a schematic view of an exemplary gas distribution system in accordance with some embodiments of the present invention. The gas distribution system 400 is substantially similar to the gas distribution system 100 except the mounting block 122 has been replaced with a plurality of first mounting blocks 402 and a plurality of second mounting blocks 404. The gas distribution system 400 may include the controller 130, the electrical actuation manifold 131, the seal 316, pressure gauges and other components of the gas distribution system 100 that have been omitted from FIG. 4 and are described above. Further, although the gas distribution system 400 is illustrated to show the first and second flow control manifolds 106, 108 having three orifices per manifold, the manifolds 106, 108 may include an suitable number of orifices as discussed above.

The gas distribution system 400 includes a plurality of first mounting blocks 402, where each second mounting block 402 is a component of the first flow control manifold 106. For example, each first mounting block 402 may include the inlet 302 and the first and second outlets 304, 306 as discussed above. The inlet 302 may be part of the first sub-path 105 and the first and second outlets 304, 306 may be part of the second sub-path 107 of the first flow control manifold 106 as discussed above. For example, in some embodiments, the first outlet 304 and the second outlet 306 of adjacent first mounting blocks 402 may be coupled to form portions of the second sub-path 107. In some embodiments, one of the first or second outlets 304, 306 of a first mounting block 402 may be coupled to the first outlet 116 of the first flow control manifold 106 as shown. In some embodiments, and as discussed above, some of the first valves 112 may be a two-way (for example, the first valve 112 at the bottom of FIG. 4) and have a single outlet 310. Accordingly, in embodiments where the first valve 112 is a two-way valve, a first mounting block 402 may include a single outlet 304 as shown.

The gas distribution system 400 includes a plurality of second mounting blocks 404, where each second mounting block 404 is a component of the second flow control manifold 108. Embodiments of the second mounting block 402 and each second valve 120 in the gas distribution system 400 are substantially similar to those discussed above for each first mounting block 402 and each first valve 112.

Embodiments of the present invention provide a gas distribution system for delivery of a gas to a chamber. The inventive apparatus advantageously provides a gas delivery to a process chamber in a desired flow ratio. The apparatus provides for this in a passive manner, without the use of active flow metering controls. Specifically, the inventive apparatus utilizes a plurality of precision orifices arranged in two flow control manifolds that can be selectively coupled between a gas source and a desired gas delivery zone. The inventive apparatus may advantageously reduce general process drift. Further, the inventive apparatus may have a reduced footprint and cost, at least in some embodiments, due to the at least partial inclusion of one or more flow paths within a machined mounting block or plurality of mounting blocks.

While the foregoing is directed to embodiments of the present invention, other and further embodiments of the invention may be devised without departing from the basic scope thereof.

The invention claimed is:

1. An apparatus for controlling gas distribution, comprising:
   a first flow path from an inlet to a first outlet;
   a plurality of first orifices disposed within the first flow path;
   a plurality of first valves that selectively control gas flow through respective ones of the plurality of first orifices to control a total gas flow at the first outlet of the first flow path, wherein ones of each of the plurality of first orifices are disposed along an inlet of each corresponding first valve, and wherein the first flow path is defined through the plurality of first valves to the first outlet, and wherein a first valve of the plurality of first valves is a two-way valve and a remainder of the plurality of first valves are three-way valves;
   a second flow path from the inlet to a second outlet;
   a plurality of second orifices disposed along the second flow path;
   a plurality of second valves that selectively control gas flow through respective ones of the plurality of second orifices to control a total gas flow at the second outlet of the second flow path; and
   a mounting block having the plurality of first valves and the plurality of second valves coupled to the mounting block, wherein at least a portion of the first flow path and at least a portion of the second flow path is disposed within the mounting block.

2. The apparatus of claim 1, wherein the first flow path and the second flow path are predominantly disposed within the mounting block.

3. The apparatus of claim 1, further comprising:
   a plurality of seals, wherein each one of the plurality of seals is disposed at an interface between one of the plurality of first valves and the mounting block or one of the plurality of second valves and the mounting block and wherein one of the plurality of first orifices or ones of the plurality of second orifices is disposed in each one of the plurality of seals.

4. The apparatus of claim 1, wherein at least one of the plurality of first orifices is disposed within a corresponding at least one of the plurality of first valves.

5. The apparatus of claim 1, further comprising:
a plurality of inserts, each one of the plurality of inserts has an opening extending through the one of the plurality of inserts, wherein each one of the plurality of inserts has one of the plurality of first orifices or one of the plurality of second orifices disposed in the opening, and wherein each one of the plurality of inserts is respectively disposed in a flow opening of one of the plurality of first valves or a flow opening of one of the plurality of second valves.

6. The apparatus of claim 1, wherein at least one of the plurality of first orifices is disposed within the mounting block.

7. The apparatus of claim 1, further comprising:
a plurality of inserts, each one of the plurality of inserts having an opening extending through the one of the plurality of inserts, wherein each one of the plurality of inserts has one of the plurality of first orifices or one of the plurality of second orifices disposed in the opening, and wherein each one of the plurality of inserts is respectively disposed in the mounting block.

8. The apparatus of claim 1, wherein each one of the plurality of first valves further comprises a first opening having one of the plurality of first orifices disposed in the first opening and wherein each one of the plurality of second valves further comprises a second opening having one of the plurality of second orifices disposed in the second opening.

9. The apparatus of claim 1, wherein the mounting block further comprises:
a plurality of mounting blocks, wherein each one of the plurality of mounting blocks is coupled to one of the plurality of first valves or one of the plurality of second valves and wherein at least a portion of the first flow path or at least a portion of the second flow path is disposed within each of the plurality of mounting blocks.

10. The apparatus of claim 9, further comprising:
a plurality of conduits coupling each of the plurality of mounting blocks to define the first flow path and the second flow path.

11. The apparatus of claim 1, wherein the mounting block further comprises:
a plurality of first blocks, wherein each one of the plurality of first blocks is a component of the first flow path and is fluidly coupled to both the inlet and the first outlet, and wherein one of the plurality of first valves is coupled to each one of the plurality of first blocks; and
a plurality of second blocks, wherein each one of the plurality of second blocks is a component of the second flow path and is fluidly coupled to both the inlet and the second outlet, and wherein in one of the plurality of second valves is coupled to each one of the plurality of second blocks.

12. The apparatus of claim 1, wherein the first outlet is coupled to a first gas delivery zone of a first process chamber and the second outlet is coupled to a second gas delivery zone of the first process chamber.

13. The apparatus of claim 12, wherein the first outlet is further coupled to a first gas delivery zone of a second process chamber and the second outlet is further coupled to a second gas delivery zone of the second process chamber.

14. The apparatus of claim 1, wherein the first outlet is coupled to a gas delivery zone of a first process chamber and the second outlet is coupled to a gas delivery zone of a second process chamber.

15. The apparatus of claim 1, wherein each one of the plurality of first valves and each one of the plurality of second valves is a pneumatic valve.

16. The apparatus of claim 15, further comprising:
a plurality of electrical actuation devices, wherein each one of the plurality of electrical actuation devices is coupled to one of the plurality of first valves or one of the plurality of second valves for electrically actuating pneumatic control of the one of the plurality of first valves or the one of the plurality of second valves.

17. The apparatus of claim 16, further comprising:
a controller to control the plurality of electrical actuation devices to selectively actuate ones of the plurality of first valves and ones of the plurality of second valves to provide a first desired flow rate through the first outlet and to provide a second desired flow rate through the second outlet.

18. An apparatus for controlling gas distribution, comprising:
a mounting block having an inlet, a first outlet, and a second outlet, wherein the inlet is coupled through a first flow path to the first outlet and wherein the inlet is coupled through a second flow path to the second outlet, wherein the mounting block is formed by a plurality of blocks coupled together, and wherein the first and second flow paths are disposed at least partially within the mounting block;
a plurality of first valves coupled to the mounting block along the first flow path and a plurality of second valves coupled to the mounting block along the second flow path;
a plurality of seals, wherein each one of the plurality of seals is disposed between each one of the plurality of first valves and the mounting block or each one of the plurality of second valves and the mounting block;
a plurality of first orifices disposed within the first flow path, wherein each one of the plurality of first valves selectively controls gas flow through a corresponding one of the plurality of first orifices to control a total gas flow at the first outlet, wherein ones of each of the plurality of first orifices are disposed along an inlet of each corresponding first valve, and wherein the first flow path is defined through the plurality of first valves to the first outlet, and wherein a first valve of the plurality of first valves is a two-way valve and a remainder of the plurality of first valves are three-way valves; and
a plurality of second orifices disposed within the second flow path, wherein each one of the plurality of second valves selectively controls gas flow through a corresponding one of the plurality of second orifices to control a total gas flow at the second outlet.

19. The apparatus of claim 18, wherein each one of the plurality of first orifices is disposed within one of the plurality of seals, one of the plurality of first valves, or one of the plurality of blocks.

20. The apparatus of claim 18, wherein each one of the plurality of blocks is coupled to one of the plurality of first valves or one of the plurality of second valves and wherein at least a portion of the first flow path or at least a portion of the second flow path is disposed within each one of the plurality of blocks.

* * * * *